(12) United States Patent
Horev et al.

(10) Patent No.: US 11,221,799 B2
(45) Date of Patent: Jan. 11, 2022

(54) TECHNIQUES FOR CLUSTERING COMPUTE NODES IN DISTRIBUTED STORAGE

(71) Applicant: Vast Data Ltd., Tel Aviv (IL)

(72) Inventors: Alon Horev, Tel Aviv (IL); Jeff Denworth, Red Bank, NJ (US); Andrew Pernsteiner, Portland, OR (US); Yuval Mintz, Herzliya (IL); Alex Turin, Kiryat Ono (IL)

(73) Assignee: Vast Data Ltd., Tel Aviv (IL)

( * ) Notice: Subject to any disclaimer, the term of this patent is extended or adjusted under 35 U.S.C. 154(b) by 107 days.

(21) Appl. No.: 16/793,444

(22) Filed: Feb. 18, 2020

(65) Prior Publication Data
US 2021/0255800 A1    Aug. 19, 2021

(51) Int. Cl.
*G06F 3/06*    (2006.01)
*G06F 9/38*    (2018.01)

(52) U.S. Cl.
CPC ............ *G06F 3/0659* (2013.01); *G06F 3/064* (2013.01); *G06F 3/067* (2013.01); *G06F 9/3891* (2013.01); *G06F 3/0604* (2013.01)

(58) Field of Classification Search
None
See application file for complete search history.

(56) References Cited

U.S. PATENT DOCUMENTS

| | | |
|---|---|---|
| 8,392,575 B1 | 3/2013 | Marr |
| 9,213,485 B1 | 12/2015 | Hayes et al. |
| 9,979,672 B2 | 5/2018 | Jackson |
| 2015/0121134 A1* | 4/2015 | Wipfel ............... G06F 11/2094 714/6.31 |

* cited by examiner

*Primary Examiner* — Brian R Peugh
(74) *Attorney, Agent, or Firm* — M&B IP Analysts, LLC

(57) ABSTRACT

A distributed storage system. The distributed storage system includes a plurality of storage nodes (DNodes), wherein the DNodes are configured to store a plurality of elements and a plurality of data blocks, wherein each element is a persistent metadata structure, wherein at least one of the elements store at least one attribute, wherein the at least one attribute includes a plurality of pointers; and a plurality of compute nodes (CNodes), wherein each CNode has access to each of the DNodes, wherein each CNode is assigned to a respective at least one cluster of a plurality of clusters, wherein each CNode is configured to receive at least a portion of access commands directed to the respective at least one cluster and to execute the received access commands based on the plurality of elements.

14 Claims, 6 Drawing Sheets

TECHNIQUES FOR CLUSTERING COMPUTE NODES IN DISTRIBUTED STORAGE

TECHNICAL FIELD

The present disclosure relates generally to distributed storage, and more specifically to clustering compute nodes which perform storage functions among a distributed storage.

BACKGROUND

Distributed storage systems are often used to provide services to multiple distinct entities (for example, individual users, companies, or other groups of users). Different entities may have different needs for their respective uses of a distributed storage system. To this end, these different entities may be allocated different portions of storage, for example, using a subscription pricing model.

These entities may communicate with the distributed storage systems via networks such as, for example, fabrics made up of interconnected nodes. These networks may have different architectures and require communicating via different protocols.

It would therefore be advantageous to provide a solution that further improves distributed storage systems in a manner that accommodates the needs of different entities.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

The disclosed embodiments include a distributed storage system. The distributed storage system comprises a plurality of storage nodes (DNodes), wherein the DNodes are configured to store a plurality of elements and a plurality of data blocks, wherein each element is a persistent metadata structure, wherein at least one of the elements store at least one attribute, wherein the at least one attribute includes a plurality of pointers; and a plurality of compute nodes (CNodes), wherein each CNode has access to each of the DNodes, wherein each CNode is assigned to a respective at least one cluster of a plurality of clusters, wherein each CNode is configured to receive at least a portion of access commands directed to the respective at least one cluster and to execute the received access commands based on the plurality of elements.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
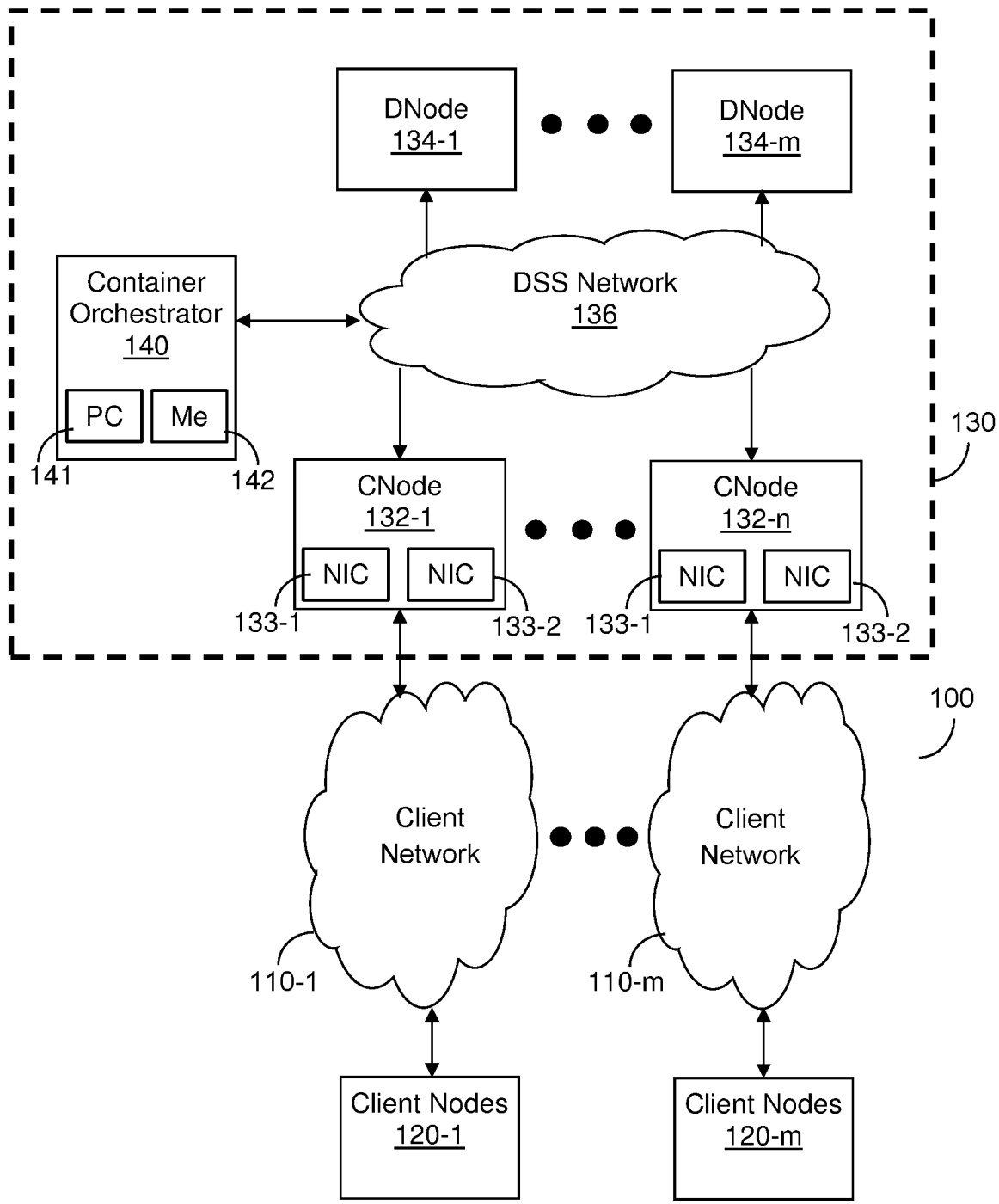
FIG. 1 is a network diagram showing a distributed storage system utilized to describe various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

It has been identified that performance of distributed storage systems could be further customized to different entities' needs by clustering compute nodes and assigning clusters of compute nodes to specific entities. To this end, the disclosed embodiments include techniques allowing for such clustering. The disclosed techniques allow for assigning clusters of compute nodes to different entities for purposes such as, but not limited to, using the same storage nodes for different clusters of compute nodes, controlling computing resource allotment to different entities, allocating groups of compute nodes to different tasks, and the like.

In various, the clustering may be used to restrict use of compute nodes for different clients. The disclosed embodiments therefore allow, for example, for charging a tenant of the distributed storage system based on a desired number of compute nodes and capping their usage by including the desired number of compute nodes across clusters associated with the tenant.

The disclosed embodiments also include techniques for dynamically changing groupings of compute nodes as well as for providing sharing of resources in the event of failure. The disclosed embodiments further allow for clients of the distributed storage system to define clusters of compute nodes and configurations with respect to sharing of resources. Further, different workloads (e.g., workloads of different applications) may be mapped to different clusters of compute nodes, thereby allowing for partitioning of computing resources that prevents co-tenants from monopolizing each other's resources. Accordingly, the disclosed embodiments allow for customization of compute node resource allocation based on users' needs.

In some embodiments, access permissions may differ for different clusters of compute nodes. Further, each CNode may belong to multiple clusters. Thus, the disclosed embodiments allow for sharing of hardware resources while providing the security benefits of network isolation.

FIG. 1 is an example network diagram 100 illustrating a distributed storage system utilized according to various disclosed embodiments. The network diagram 100 includes a distributed storage system 130, one or more networks 110-1 through 110-n (referred to as a network 110 or as networks 110 for simplicity), and client nodes 120-1 through 120-*m* (referred to as a client node 120 or as client nodes 120 for simplicity).

The distributed storage compute node 132 includes compute nodes 132-1 through 132-*n* (referred to as a CNode 132 or as CNodes 132 for simplicity), storage nodes (DNodes) 134-1 through 134-*m* (referred to as a DNode 134 or as DNodes 134 for simplicity), and a DSS network 136. The distributed storage compute node 132 may be configured as described further in U.S. patent application Ser. No. 16/002,676, assigned to the common assignee, the contents of which are hereby incorporated by reference.

The DSS network 136 may be, but is not limited to, a wireless, cellular or wired network, a local area network (LAN), a wide area network (WAN), a metro area network (MAN), the Internet, the worldwide web (WWW), similar networks, and any combination thereof. The client node 120 may be, but is not limited to, a server, a personal computer, a laptop, a tablet computer, a smartphone, or any other device configured to store data, access data, or both. In an example implementation, the DSS network 136 is a fabric including multiple nodes (not shown) used for communicating between the CNodes 132 and the DNodes 134.

The DNodes 134 may be realized as combinations of volatile (e.g., RAM) and non-volatile (e.g., Flash, 3D Xpoint) memories. The non-volatile memories may be included in, for example, hard-disk drives (HDDs), solid state drives (SSDs), or a combination thereof.

The CNodes 132 may be configured to translate access commands into formats supported by the DNodes 134. Example protocols supported via translation by the CNodes 132 may include, but are not limited to, Block protocols, Network Attached System protocols [e.g., Network File System (NFS) protocol, Server Message Block (SMB) protocol, etc.], Object Store protocols [e.g., Simple Storage Service (S3) protocol], Key Value Store protocol, and the like. When the CNodes 132 are configured to translate access commands into a format that is supported by the protocol of the DNodes 134, support for new protocols may be added by configuring the CNodes 132 with translation rules for the new protocols. The translation rules may include rules for converting access commands in a received format into a format that is compatible with the protocol supported by the DNodes 134.

In an example implementation, the CNodes 132 collectively act as a distributed transaction manager for accessing data in the DNodes 134. As the CNodes 132 do not store the data to be accessed by client nodes or the metadata used for navigating to locations in the DNodes 134, such data and metadata do not need to be recovered when one or more of the CNodes 132 fails. Additionally, CNodes 132 may be added or removed without disrupting data stored in the storage compute node 132. An example schematic diagram of a CNode 132 is described below with respect to FIG. 5. Further, example configurations for the CNodes 132 and DNodes 134 are described further in U.S. patent application Ser. No. 16/002,676, assigned to the common assignee, the contents of which are hereby incorporated by reference.

Figure 4A:
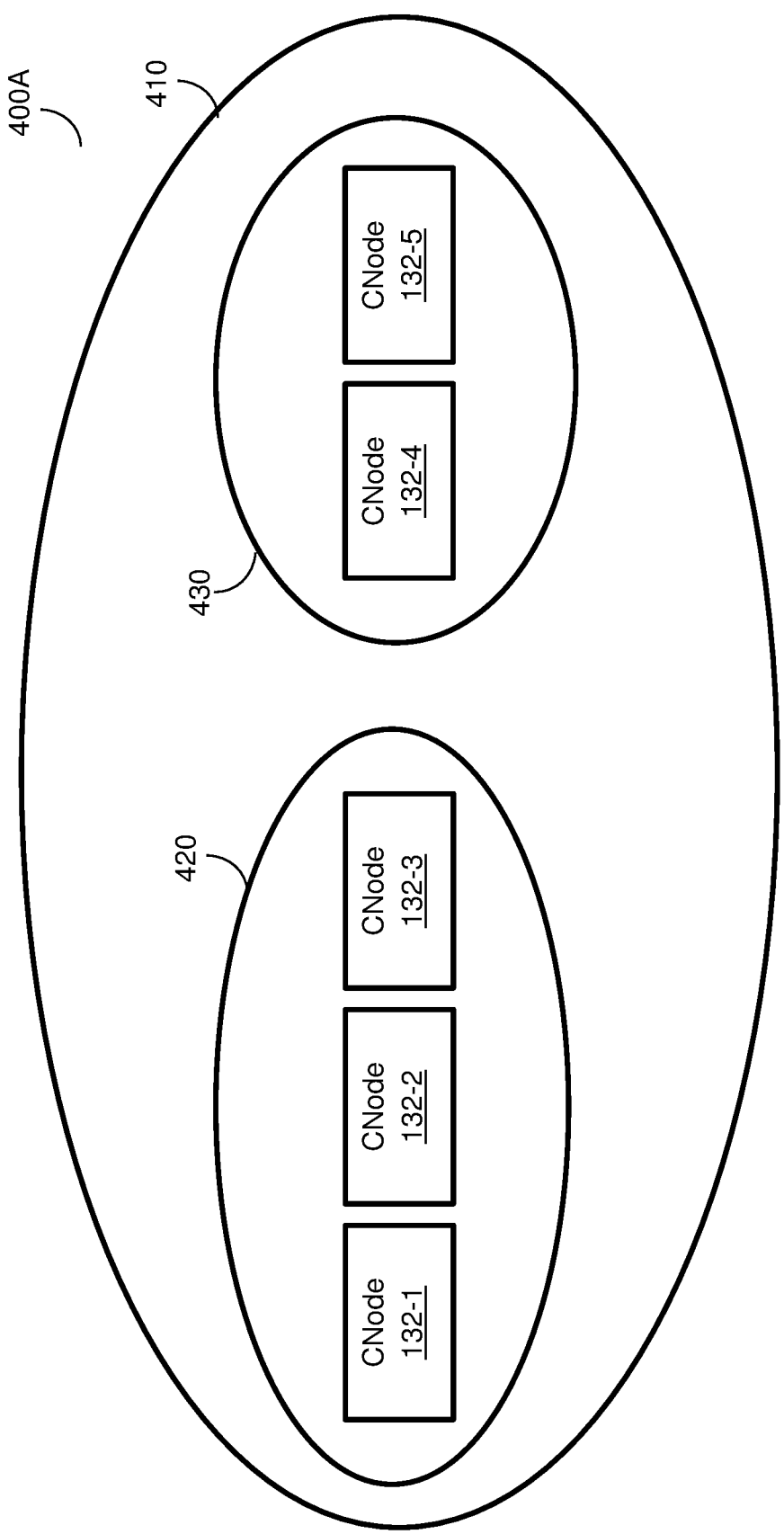
FIGS. 4A-B are cluster diagrams illustrating example clustering schemes for compute nodes.
Figure 4B:
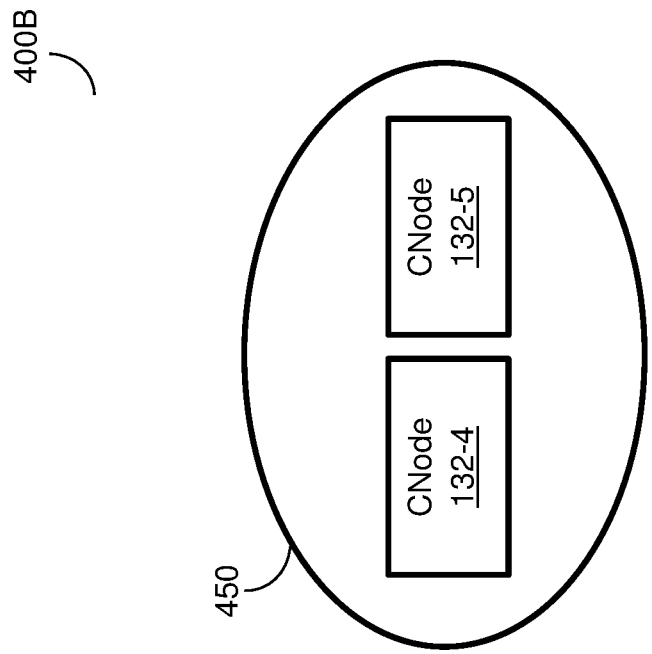
Figure 4B:
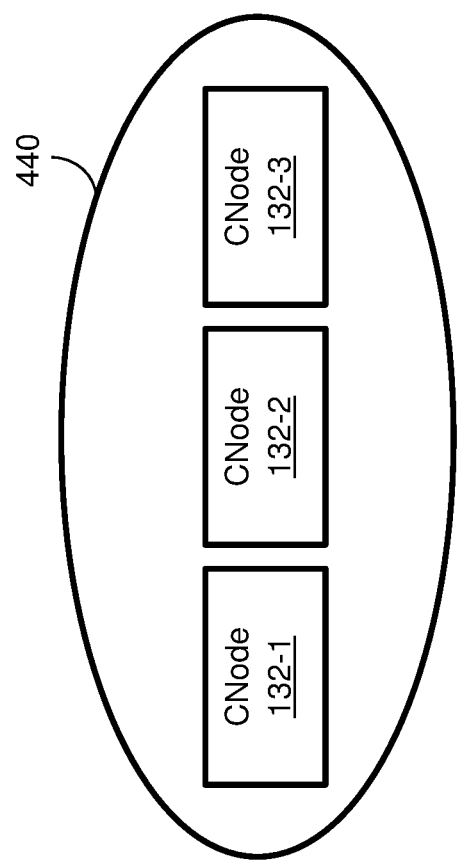

In an embodiment, the CNodes 132 are logically clustered, i.e., the CNodes 132 are assigned to clusters using logical partitions instead of or in addition to being physically separated. Logically clustering the CNodes 132 provides various benefits such as, but not limited to, allowing CNodes 132 to belong to multiple clusters, allowing for dynamic partitioning of CNodes 132, and the like. Non-limiting examples of such clustering are shown in FIGS. 4A-B. In the example clustering scheme 400A shown in FIG. 4A, CNodes 132-1 through 132-3 are clustered into a first sub-cluster 420, and CNodes 132-4 and 132-5 are clustered into a second sub-cluster 430. The sub-clusters 420 and 430 are further clustered into a luster 410.

As a non-limiting example, the sub-clusters 420 and 420 may be utilized as a production pool (i.e., a pool of CNodes 132 used for a production workload) and a quality assurance pool (i.e., a pool of CNodes 132 used for a quality assurance workload), with any of the CNodes 132 being available for use in the cluster 410 as a backup pool (i.e., a pool of CNodes 132 that are used as backups in the event that one of the sub-clusters does not have sufficient computing resources due to CNode 132 failure).

FIG. 4B shows an alternative example clustering scheme 400B in which the CNodes 132-1 through 132-3 are clustered into a first cluster 440 and the CNodes 132-4 and 132-5 are clustered into a second cluster 450. The first and second clusters 440 and 450 may be, for example, clusters belonging to different clients and, therefore, the option to not share CNodes 132 as backups may be selected.

It should be noted that the clustering schemes of FIGS. 4A-B are merely examples and that other clustering schemes may be equally utilized without departing from the scope of the disclosure. In particular, different numbers of clusters, different numbers of compute nodes per cluster, different levels of sub-clustering, different arrangements of clusters, or a combination thereof, may be utilized without departing from the scope of the disclosure.

Returning to FIG. 1, in some implementations, the CNodes 132 may be dynamically clustered to allow for flexibility based on evolving needs. To this end, in some implementations, the CNodes 132 may be realized as virtual machines instead of discrete pieces of hardware. In an optional embodiment, the dynamic clustering may be achieved using a container orchestrator 140 that is configured to execute or terminate additional instances of the CNodes 132 when implemented as containers. Thus, clusters may grow and shrink automatically, for example based on demand (i.e., based on a number of access requests being handled or received by each cluster).

In an embodiment, the container orchestrator 140 includes or is realized via a processing circuitry 141 and a memory 142 storing instructions (not shown). The instructions, when executed by the processing circuitry 141, configure the processing circuitry 141 to perform the functions of the container orchestrator.

In an embodiment, each CNode 132 includes two or more network interface cards (NICs). In the example implementation shown in FIG. 1, each CNode 132 includes two NICs 133-1 and 133-2. The number of NICs in each CNode 132 may depend, for example, on the number of distinct networks each CNode 132 may be required to communicate with. As a non-limiting example, the CNode 132-1 may utilize the NIC 133-1 to communicate with the DSS network 136 and may utilize the NIC 133-2 to communicate with the client network 110-1.

Different CNodes 132 may include different NICs 133. As a non-limiting example, the CNode 132-1 communicates with a client network 110-1 utilizing Infiniband protocol and include a NIC 133 configured to utilize the Infiniband protocol while the CNode 132-2 communicates with a client network 110-2 utilizing the Ethernet protocol and include a NIC 133 configured to utilize the Ethernet protocol.

In another embodiment, each CNode 132 may include one NIC. In such an embodiment, the CNodes 132 may communicate with the client networks 110 indirectly. To this end, in an example implementation, the distributed storage system 130 may be configured as shown in FIG. 2.

Figure 2:
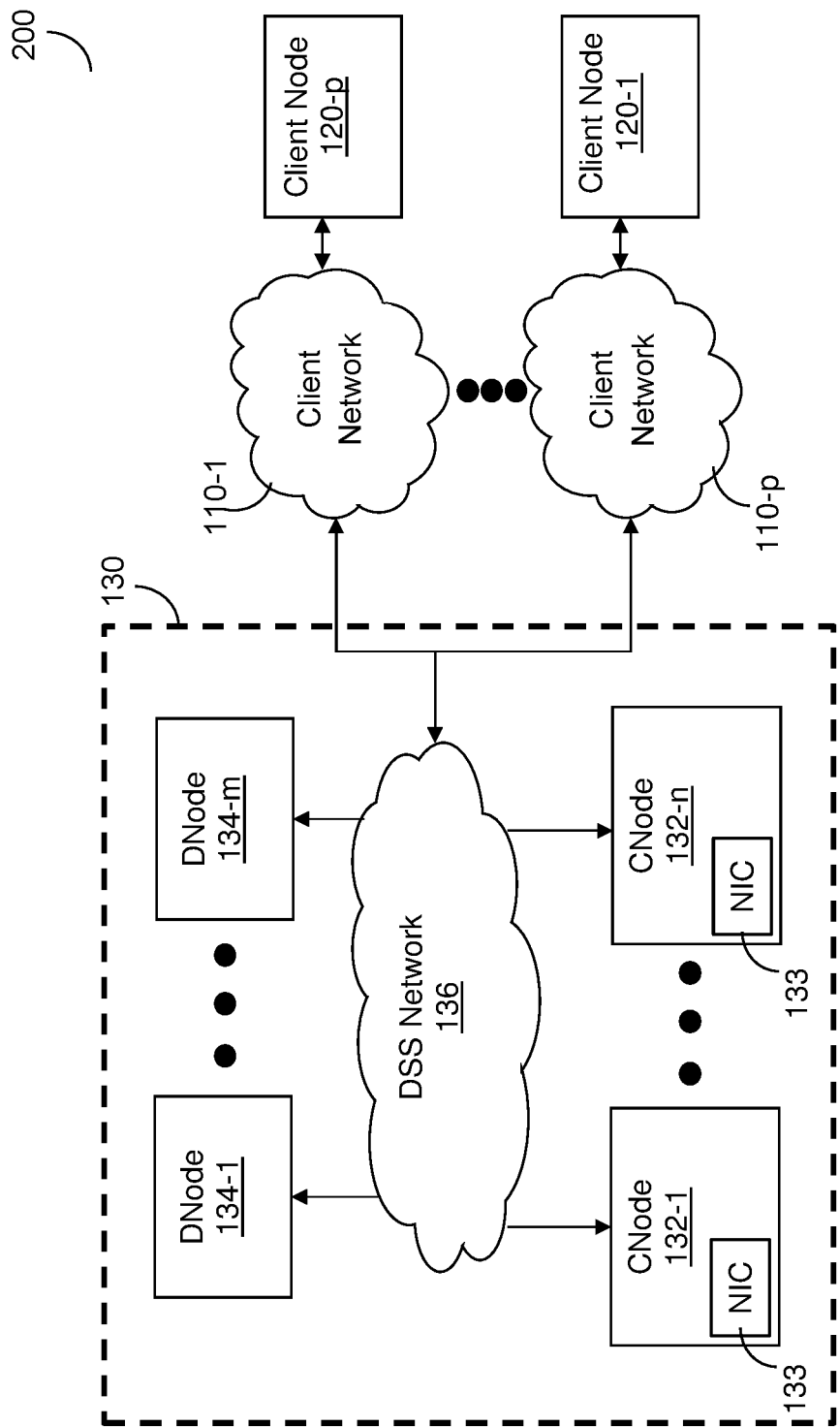
FIG. 2 is a network diagram utilized to describe various other embodiments.

As shown in FIG. 2, the CNodes 132 communicate with the DSS network 136, which in turn is communicatively connected to the client networks 110. The DSS network 136 may communicate with each of the client networks 110 using switches. Thus, the CNodes 132 communicate with the client networks 110 indirectly through the DSS network 136. This may allow, for example, each CNode 132 to communicate with client networks 110 utilizing different communications protocols from the DSS network 136 without requiring multiple different NICs in each CNode 132.

Returning to FIG. 1, each client node 120 is configured to send access commands to the distributed storage compute nodes 132 via a respective client network 110. The CNodes 132 are configured to receive access commands from the client nodes 120 and to access the DNodes 134 based on the received commands. The access may include translating the received commands into a format supported by the DNodes 134. As shown in FIG. 1, each CNode 132 may access all DNodes 134. As a non-limiting example, NVM Express (NVMe) over Fabrics may be utilized to enable such access.

Each client network 110 may be, but is not limited to, a wireless, cellular or wired network, a local area network (LAN), a wide area network (WAN), a metro area network (MAN), the Internet, the worldwide web (WWW), similar networks, and any combination thereof. The client node 120 may be, but is not limited to, a server, a personal computer, a laptop, a tablet computer, a smartphone, or any other device configured to store data, access data, or both. In some implementations, each client network 110 may be a fabric including multiple nodes (not shown) used for communicating between the CNodes 132 and the DNodes 134.

The access may include navigating an element store distributed across the DNodes 134 to access data in data blocks stored in the DNodes 134. The CNodes 132 are configured to navigate the element store to read the data blocks and to modify the element store by, for example, splitting blocks, merging blocks, and the like. To this end, the CNodes 132 may be configured to allocate new blocks, write data to blocks, read data from blocks, add and remove pointers in blocks, and the like.

Each element may further include an element data store (not shown) allowing for read and write operations of data to the element. Whether the element includes an element data store may depend on the type of the element. As a non-limiting example, a file may have an element data store. The element data store may be thinly provisioned with byte granularity such that the number of bytes written to the element data store is the number of bytes used.

In some implementations, at least a portion of the data blocks may be temporarily included in the elements and stored in, for example, 3D Xpoint memory of the DNodes 134 before being migrated from the 3D Xpoint memory to Flash memory of the DNodes 134. When the data is migrated to the Flash memory, the pointers of the elements which had stored the migrated data may be updated to point to the location of the migrated data in the Flash memory. The temporary storage of the data blocks allows for manipulating the data blocks (e.g., via encoding, data reduction, etc.) in the 3D Xpoint memory before migrating the data blocks to the Flash memory.

It should be noted that FIG. 1 is merely an example, and that the disclosed embodiments are not limited to application in the particular distributed storage system 130.

It should also be noted that a single client node 120 is shown communicating with each client network 110 and that a single client network 110 is shown communicating with each CNode 132 merely for simplicity purposes and without limitation on the disclosed embodiments. Each CNode 132 may communicate with multiple client networks 110, each of which may in turn allow for receiving access commands from multiple client nodes 120, without departing from the scope of the disclosure.

Figure 3:
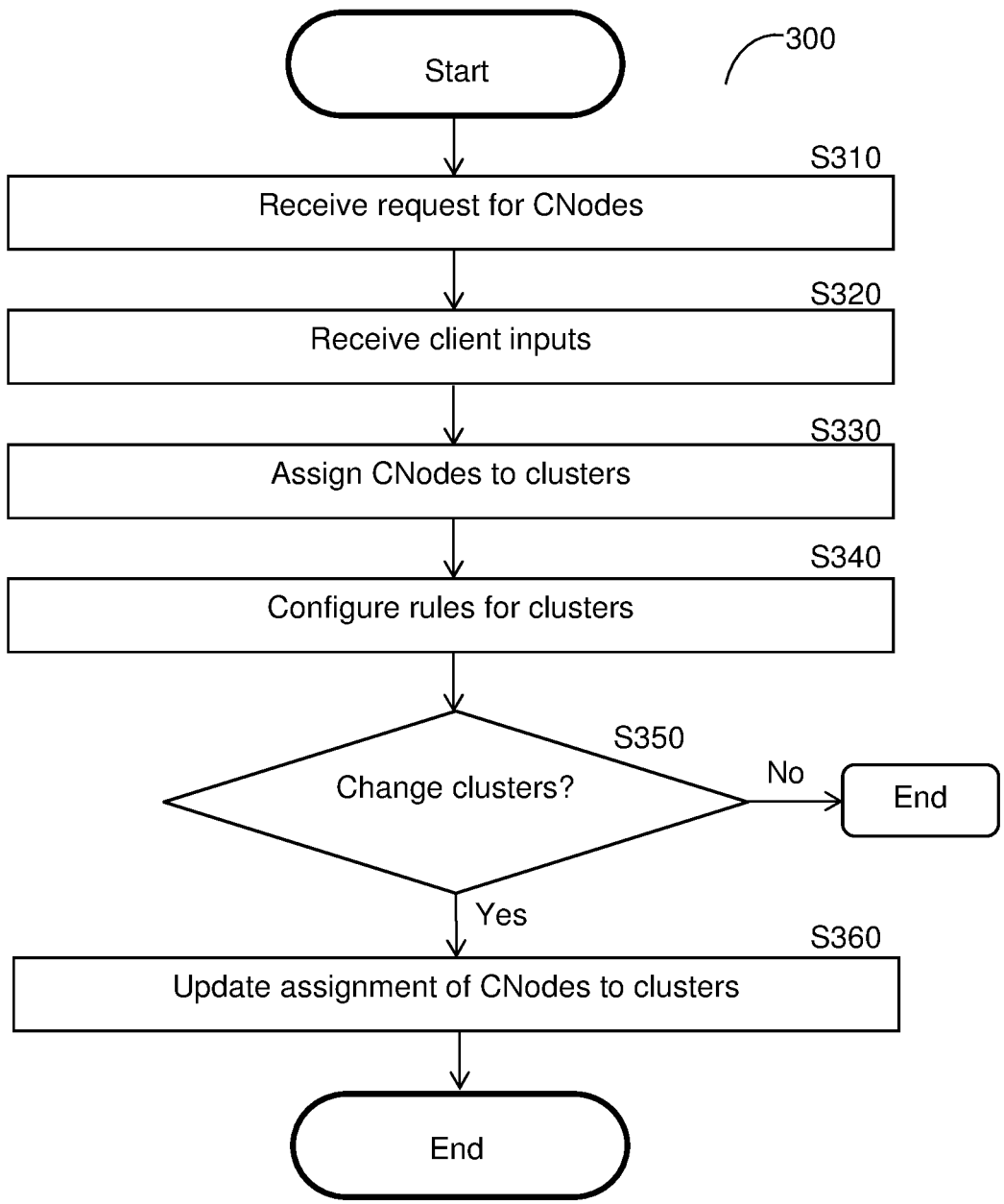
FIG. 3 is a flowchart illustrating a method for clustering compute nodes according to an embodiment.

FIG. 3 is an example flowchart 300 illustrating a method for clustering compute nodes according to an embodiment. In an embodiment, the method is performed by one of the CNodes 132, FIG. 1.

At S310, a request to allocate compute nodes (CNodes) to a cluster is received. The request may include a number of compute nodes to be allocated to a client based on, as a non-limiting example, a subscription of the client (e.g., the client subscribes to use of a predetermined number of compute nodes per month).

At optional S320, client inputs related to initial clustering may be received. The client inputs may include, but are not limited to, assignments of CNodes into clusters and sub-clusters, configurations for each cluster, and the like.

At S330, CNodes are assigned to clusters based on the request, client inputs, or both. Each CNode may further be assigned to one or more sub-clusters within a cluster (i.e., such that the CNode belongs to a sub-cluster and to the cluster including the sub-cluster), to additional clusters (i.e., a CNode may belong to more than one cluster), and the like. In a non-limiting example implementation, at least one cluster is assigned for each client so as to prevent sharing of computing resources among clients.

In some embodiments, the clusters may be further mapped to discrete computing tasks. Such discrete computing tasks may include, but are not limited to, different types of transactions, different workloads, tasks requested by different clients, functions of different application programs, and the like.

As a non-limiting example, different clusters may be mapped to different workloads such that the number of CNodes allocated may differ among workloads. As another non-limiting example, all CNodes that will perform reads may be allocated to a first cluster and all CNodes that will perform writes may be allocated to a second cluster such that the first cluster is a read CNode cluster and the second cluster is a write CNode cluster. At optional S340, rules are configured for the clusters. The rules may be configured based on, for example the client inputs, or may be predetermined rules. The rules may include rules for, but not limited to, optimization of resources, failover procedures, and the like. The optimization rules may define when to grow and shrink allocation of CNodes to clusters based on, for example, demand, resource allocation, or both. To this end, in an embodiment, S340 may further include sending the rules to a container orchestrator for use in managing deployment of instances of the CNodes.

The failover procedures may allow for CNodes to be used in the event of failure of other CNodes. In an example implementation, a client may configure the failover procedure to select which CNodes should be used in the event of a failover from among all CNodes allocated to the client. In an example implementation, the failover procedures may provide for switching to active CNodes in a cluster when one or more CNodes in the cluster have failed, and may further provide for switching to active CNodes of other clusters when all CNodes of a cluster have failed.

The rules for each of the clusters may further include limitations based on, for example, resource allocation with respect to each cluster. As a non-limiting example, a client using the distributed storage system may be allocated a predetermined maximum amount of computing resources (e.g., as defined with respect to a number of CNodes) based on a payment scheme, and the rules for the clusters may include limitations on growing the clusters based on the resource allocation. As another non-limiting example, a client using the distributed storage system for multiple application programs may divide resources allocated to the client among the application programs such that different application programs are limited to different maximum numbers of CNodes.

The rules may further define how failover procedures are to be performed. In an example implementation, if a CNode fails, its Internet Protocol (IP) address may be reassigned to other CNodes in the same cluster. In another example implementation, all CNodes in the cluster may share an IP address such that the other CNodes in the same cluster such that execution continues normally with the traffic that would have gone to the failed CNode being distributed among the rest of the cluster.

At S350, it is determined whether the clusters should be changed and, if so, execution continues with S360; otherwise, execution terminates. In an embodiment, the clusters may need to be changed when, for example, a new client has been added, the number of CNodes to be allocated to a client has changed, a condition defined in the optimization rules has been met, and the like.

At S360, the assignment of CNodes to clusters is updated. In some implementations, S360 may be performed iteratively, for example, periodically or as updates are required.

Figure 5:
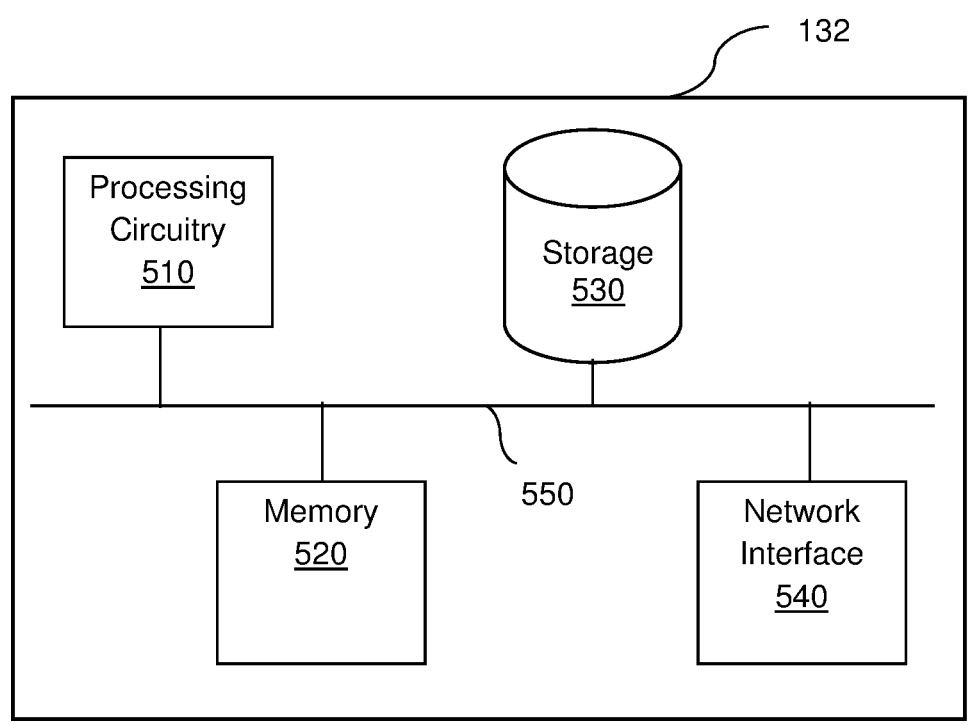
FIG. 5 is a schematic diagram of a compute node according to an embodiment.

FIG. 5 is an example schematic diagram of a compute node 132 according to an embodiment. The compute node 132 includes a processing circuitry 410 coupled to a memory 520, a storage 530, and a network interface 540. In an embodiment, the components of the compute node 132 may be communicatively connected via a bus 550.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 520 may be volatile (e.g., RAM, etc.), non-volatile (e.g., ROM, flash memory, etc.), or a combination thereof.

In one configuration, software for implementing one or more embodiments disclosed herein may be stored in the storage 530. In another configuration, the memory 520 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 510, cause the processing circuitry 510 to perform the various processes described herein.

The storage 530 may be magnetic storage, optical storage, and the like, and may be realized, for example, as flash memory or other memory technology, CD-ROM, Digital Versatile Disks (DVDs), or any other medium which can be used to store the desired information.

The network interface 540 allows the compute node 132 to communicate with the storage nodes 134 for the purpose of, for example, sending access commands, receiving data, and the like. Further, the network interface 540 allows the compute node 132 to communicate with the client nodes 120 for the purpose of receiving data requests, sending data received from the storage nodes 134, and the like.

It should be understood that the embodiments described herein are not limited to the specific architecture illustrated in FIG. 5, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C;

3A; A and B in combination; B and C in combination; A and C in combination; A, B, and C in combination; 2A and C in combination; A, 3B, and 2C in combination; and the like.

What is claimed is:

1. A distributed storage system, comprising:
   a plurality of storage nodes (DNodes), wherein the DNodes are configured to store a plurality of elements and a plurality of data blocks, wherein each element is a persistent metadata structure, wherein at least one of the elements store at least one attribute, wherein the at least one attribute includes a plurality of pointers;
   a plurality of compute nodes (CNodes), wherein each CNode has access to each of the DNodes, wherein each CNode is assigned to a respective at least one cluster of a plurality of clusters, wherein each CNode is configured to receive at least a portion of access commands directed to the respective at least one cluster and to execute the received access commands based on the plurality of elements; and
   a first computing fabric, wherein the plurality of compute nodes is configured to access the plurality of storage nodes via the first computing fabric, wherein the first computing fabric is communicatively connected to at least one second computing fabric, wherein each CNode is configured to receive the at least a portion of access commands from the at least one second computing fabric via the first computing fabric.

2. The distributed storage system of claim 1, wherein each CNode further comprises a first network interface card (NIC) for communicating via the first computing fabric and a second NIC for communicating via the at least one second computing fabric.

3. The distributed storage system of claim 1, wherein the distributed storage system is configured to switch to at least one active CNode of a cluster when at least one CNode of the cluster has failed.

4. The distributed storage system of claim 1, wherein the plurality of clusters includes at least one first cluster, wherein each CNode assigned to one of the at least one first cluster is configured to provide failover support when all CNodes assigned to a second cluster of the plurality of clusters have failed.

5. The distributed storage system of claim 4, wherein the failover support is defined by failover rules, wherein the failover rules are determined based on at least one user input.

6. The distributed storage system of claim 1, wherein the plurality of clusters includes a first cluster and a second cluster, wherein each CNode assigned to the first cluster is configured to perform a first type of storage transaction, wherein each CNode assigned to the second cluster is configured to perform a second type of storage transaction.

7. The distributed storage system of claim 1, wherein the plurality of clusters includes a first cluster and a second cluster, wherein each CNode assigned to the first cluster is configured to perform storage transactions for a first workload, wherein each CNode assigned to the second cluster is configured to perform storage transactions for a second workload.

8. The distributed storage system of claim 1, wherein each of the plurality of clusters is associated with a respective client, wherein each CNode in one of the plurality of clusters receives the at least a portion of access commands from client nodes of the respective client of the cluster.

9. The distributed storage system of claim 1, further comprising:
   a container orchestrator, wherein each of the plurality of CNodes is a container, wherein the container orchestrator is configured to grow and shrink the plurality of clusters by adding and removing instances of CNodes, respectively.

10. The distributed storage system of claim 9, wherein the container orchestrator is configured to grow and shrink the plurality of clusters based on demand.

11. The distributed storage system of claim 9, wherein each of the plurality of clusters corresponds to a respective application program, wherein each CNode assigned to one of the plurality of clusters is configured to perform at least one function of the corresponding application program of the cluster.

12. The distributed storage system of claim 11, wherein the container orchestrator is configured to grow and shrink each of the plurality of clusters based on a demand of the corresponding application program.

13. The distributed storage system of claim 11, wherein the container orchestrator is configured to grow and shrink each of the plurality of clusters based on a resource allocation of the cluster.

14. The distributed storage system of claim 1, wherein the plurality of CNodes is logically clustered.

* * * * *